(12) United States Patent
Papp

(10) Patent No.: US 9,062,939 B2
(45) Date of Patent: Jun. 23, 2015

(54) HELMET COVER

(76) Inventor: John P. Papp, East Grand Rapids, MI (US)

( * ) Notice: Subject to any disclaimer, the term of this patent is extended or adjusted under 35 U.S.C. 154(b) by 510 days.

(21) Appl. No.: 13/546,289

(22) Filed: Jul. 11, 2012

(65) Prior Publication Data

US 2013/0014689 A1    Jan. 17, 2013

Related U.S. Application Data

(60) Provisional application No. 61/506,443, filed on Jul. 11, 2011.

(51) Int. Cl.
| | | |
|---|---|---|
| G01L 5/00 | (2006.01) | |
| F41H 1/04 | (2006.01) | |
| A42B 3/06 | (2006.01) | |
| F41J 5/22 | (2006.01) | |
| G01P 15/08 | (2006.01) | |

(52) U.S. Cl.
CPC ... *F41H 1/04* (2013.01); *G01L 5/00* (2013.01); *A42B 3/067* (2013.01); *F41J 5/22* (2013.01); *G01P 15/0891* (2013.01)

(58) Field of Classification Search
CPC .............. G01L 5/00; A42B 3/067; F41J 5/22; G01P 15/0891
USPC ...................... 116/203; 2/410–413, 417–418, 2/420–421, 425, 2.5
See application file for complete search history.

(56) References Cited

U.S. PATENT DOCUMENTS

| | | | | |
|---|---|---|---|---|
| 3,445,860 A | * | 5/1969 | Rodell | 2/422 |
| 3,582,990 A | * | 6/1971 | Frieder | 2/6.6 |
| 3,849,801 A | * | 11/1974 | Holt et al. | 2/413 |
| 3,872,511 A | * | 3/1975 | Nichols | 2/413 |
| 4,345,336 A | * | 8/1982 | Plastino | 2/414 |
| 4,937,888 A | | 7/1990 | Straus | |
| 5,242,830 A | * | 9/1993 | Argy et al. | 436/5 |
| 5,287,562 A | * | 2/1994 | Rush, III | 2/413 |
| 5,343,569 A | | 9/1994 | Asare et al. | |
| 5,546,609 A | | 8/1996 | Rush, III | |
| 5,561,866 A | | 10/1996 | Ross | |
| 5,724,681 A | | 3/1998 | Sykes | |
| 5,732,414 A | * | 3/1998 | Monica | 2/425 |
| 5,956,777 A | * | 9/1999 | Popovich | 2/424 |
| 6,032,297 A | * | 3/2000 | Barthold et al. | 2/416 |
| 6,061,836 A | * | 5/2000 | Peters | 2/175.6 |
| 6,065,158 A | | 5/2000 | Rush, III | |

(Continued)

FOREIGN PATENT DOCUMENTS

| | | |
|---|---|---|
| DE | 3426268 | 1/1986 |
| EP | 2176123 | 3/2011 |

(Continued)

*Primary Examiner* — R. A. Smith
*Assistant Examiner* — Tania Courson
(74) *Attorney, Agent, or Firm* — Price Heneveld LLP

(57) ABSTRACT

A helmet cover comprising an outer shell and a series of internal supports, wherein the helmet cover further comprises an outer shell comprised of a material designed to fracture at the location of an impact greater than a threshold impact, providing an indicator of the strength and location of the impact, and dispersing the force of the impact around the rigid shell of the helmet. The helmet cover further comprises a marker device adapted to release a marker when an impact greater than a threshold impact is realized on the helmet cover. The helmet cover is preferably a thermoplastic material which is not cellular in nature.

19 Claims, 5 Drawing Sheets

(56) References Cited

U.S. PATENT DOCUMENTS

| | | |
|---|---|---|
| 6,237,162 B1 | 5/2001 | Gill |
| 6,256,799 B1 | 7/2001 | McGlasson et al. |
| 6,301,718 B1 | 10/2001 | Rigal |
| 6,332,228 B1 | 12/2001 | Takahara |
| 6,336,220 B1 * | 1/2002 | Sacks et al. .................... 2/22 |
| 6,711,752 B2 * | 3/2004 | Smith ............................ 2/422 |
| 7,178,632 B2 | 2/2007 | Casebolt et al. |
| 7,264,368 B2 | 9/2007 | Sherring |
| 7,328,462 B1 | 2/2008 | Straus |
| 7,509,835 B2 | 3/2009 | Beck |
| 7,878,140 B1 | 2/2011 | Steele et al. |
| 7,930,771 B2 | 4/2011 | Depreitere et al. |
| 8,104,324 B2 * | 1/2012 | Hennig et al. ............. 73/12.01 |
| 8,691,383 B2 * | 4/2014 | Georgeson et al. ....... 428/402.2 |
| 2003/0005511 A1 | 1/2003 | Tao et al. |
| 2003/0154903 A1 * | 8/2003 | Rakowski .................... 116/203 |
| 2004/0123378 A1 | 7/2004 | Timms et al. |
| 2005/0015855 A1 | 1/2005 | Skiba |
| 2005/0273911 A1 | 12/2005 | Skiba et al. |
| 2006/0038694 A1 | 2/2006 | Naunheim et al. |
| 2007/0056081 A1 | 3/2007 | Aspray |
| 2007/0245468 A1 | 10/2007 | Butler |
| 2008/0060873 A1 | 3/2008 | Lang et al. |
| 2008/0155735 A1 | 7/2008 | Ferrara |
| 2008/0163410 A1 | 7/2008 | Udelhofen |
| 2008/0172779 A1 | 7/2008 | Ferguson |
| 2010/0229308 A1 | 9/2010 | Pearce et al. |
| 2013/0086733 A1 * | 4/2013 | Szalkowski et al. ............. 2/414 |
| 2013/0291289 A1 * | 11/2013 | Szalkowski et al. ............. 2/414 |

FOREIGN PATENT DOCUMENTS

| | | | |
|---|---|---|---|
| FR | 2566632 | 1/1986 | |
| GB | 2194062 | 2/1988 | |
| GB | 2194062 A * | 2/1988 | ............ G01N 21/88 |

* cited by examiner

HELMET COVER

CROSS-REFERENCE TO RELATED APPLICATION

This application claims priority to U.S. Provisional Patent Application No. 61/506,443, filed on Jul. 11, 2011, entitled "HELMET COVER," the disclosure of which is hereby incorporated herein by reference in its entirety.

FIELD OF THE INVENTION

The present invention generally relates to a helmet cover for a traditional rigid helmet, and more particularly to a helmet cover adapted to indicate when an impact force has been realized on the helmet cover that exceeds a predetermined impact threshold.

BACKGROUND OF THE INVENTION

Traditional rigid helmets are used to protect the head of an individual from injury or trauma on a jobsite or while participating in various sports. A traditional helmet generally comprises a rigid outer shell having a layer of padding disposed within an interior of the helmet which is adjacent to and in contact with the head of a wearer. The interior padding of the helmet also serves as a cushion to the wearer in the event of an impact force or load realized on the helmet. Traditional rigid helmets used in athletic activities, such as football helmets, have outer shells which are intended to bare the brunt of an impact load during a collision event. The force that traditional rigid helmets are adapted to bare is much greater than a force necessary to cause an injury, such as a concussion, to the individual wearing the helmet. Thus, while the traditional rigid helmet may be intended to bare a great amount of force without fracture or failure, an individual wearing the helmet could receive considerable injury while the rigid outer shell of the traditional helmet would not indicate that such an impact force has been received. For example, some football helmets are designed to have the rigid outer shell maintain its integrity even upon application of forces up to approximately 11,000 pounds per square inch ("psi"). However, an impact load with a force of 11,000 psi realized on a helmet has the potential to cause significant injury to the individual wearing the helmet. Accordingly, it is desirable to provide a helmet cover to cover the outer shell of a traditional rigid helmet, wherein the helmet cover is capable of indicating when an impact force has exceeded a predetermining impact threshold, where the threshold is set at a force level indicating an impact sufficient enough to cause an injury.

SUMMARY OF THE PRESENT INVENTION

According to one aspect of the present invention, a helmet cover is provided wherein upon impact with a force over a minimum threshold, the helmet cover is fractured. The fracture provides an indication of the strength of the impact force and its location, as well as absorbing and redirecting a portion of the energy transmitted by the impact force.

Another aspect of the present invention includes, a helmet cover adapted to cover a traditional rigid shell helmet, wherein the helmet cover is adapted to indicate when an impact force has been realized on the helmet cover that exceeds a predetermined impact threshold. The helmet cover includes an outer shell having a back section, a top section, and side sections. Each section is operably coupled to an adjacent section via hinged connections such that the helmet cover is moveable between an open position and a closed position. A plurality of supports is disposed between and operably coupled to an exterior shell of the rigid helmet and each section of the outer shell. The supports are each adapted to absorb and redirect energy realized on the helmet cover by an impact force. Further, each of the plurality of supports is adapted to collapse under an impact force which exceeds a predetermined impact threshold. The helmet cover further comprises a marker mechanism capable of indicating when the helmet cover has experienced an impact force which exceeds the predetermined impact threshold, wherein the marker is visible and can be seen by either the helmet wearer or others around the individual wearing the helmet.

Another aspect of the present invention includes a polymeric helmet cover adapted to cover an exterior shell of a helmet. The helmet cover is adapted to indicate when an impact force has been realized on the helmet cover that exceeds a predetermined impact threshold. The helmet cover includes a plurality of sections wherein each section is operably coupled to adjacent sections such that the helmet cover is moveable between an open position and a closed position. A portion of an outer shell is disposed on an exterior side of each section of the plurality of helmet cover sections. The helmet cover further includes a plurality of supports disposed on an interior side of each section, wherein the supports are disposed adjacent the exterior shell of the helmet covered by the helmet cover. The supports are each adapted to absorb and redirect energy realized on the helmet cover by an impact force during a collision event. The supports are adapted to fracture under an impact force which exceeds a predetermined impact threshold measureable in psi units. A marker mechanism capable of indicating when an impact force has been realized on the helmet cover which exceeds said predetermined impact threshold is also included.

Yet another aspect of the present invention includes a polymeric helmet cover adapted to cover a helmet having an exterior shell and indicate when an impact force has been realized on the helmet cover that exceeds a predetermined impact threshold. The helmet cover includes a top section, first and second side sections, and a back section, wherein each section is operably coupled to an adjacent section such that the helmet cover is moveable between an open position and a closed position. An outer shell portion is disposed on an exterior side of the top section, the first and second side sections, and the back section, such that a unitary outer shell is formed when the helmet cover is in the closed position. A plurality of honeycomb supports is disposed on an interior side of the top section, the first and second side sections, and the back section, wherein the supports are disposed adjacent to the exterior shell of the helmet in assembly. The supports are each adapted to absorb and redirect energy realized on said helmet cover by an impact force, and further wherein each of the plurality of supports are adapted to fracture under an impact force which exceeds a predetermined impact threshold. The helmet cover further includes a marker mechanism capable of indicating when an impact force has been realized on the helmet cover which exceeds the predetermined impact threshold.

These and other aspects, objects, and features of the present invention will be understood and appreciated by those skilled in the art upon studying the following specification, claims, and appended drawings.

DETAILED DESCRIPTION OF EMBODIMENTS

Figure 1:
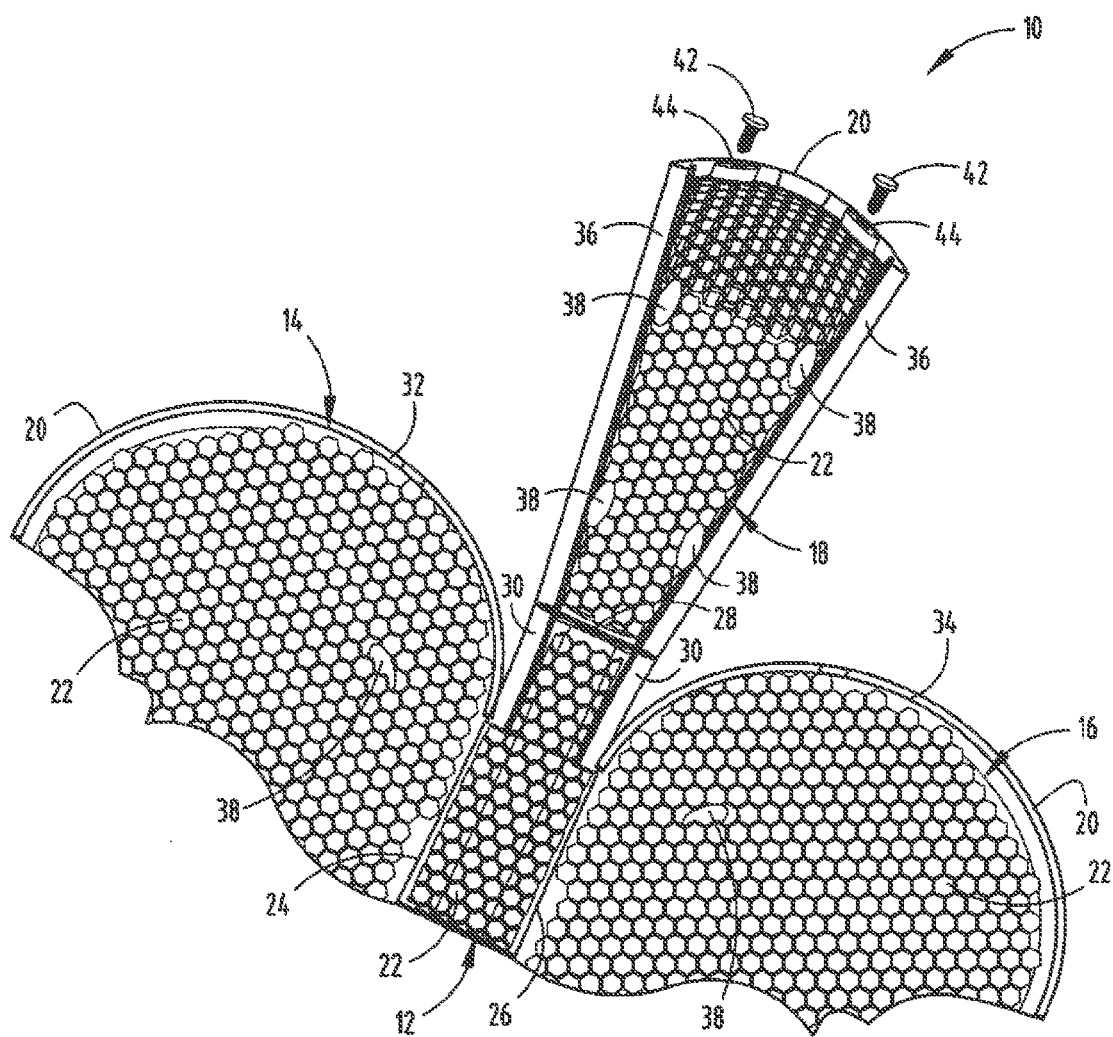
FIG. 1 is a front elevational view of an interior of one embodiment of the helmet cover in an open position for attachment to a helmet.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, the reference number 10 generally indicates a helmet cover according to one embodiment. The helmet cover 10 includes a plurality of sections including a back or rear section 12, side sections 14, 16 and a top section 18. Each section 12, 14, 16 and 18 of the helmet cover 10 comprises a portion of an outer shell 20 (FIGS. 2A and 3) disposed on an exterior side of each section (FIG. 2A), such that the sections can be moved from an open position (FIG. 1) to a closed or assembled position (FIG. 3) wherein the outer shell portions make up a unitary outer shell 20 to the helmet cover. Thus, the helmet cover 10 can be wrapped or assembled around an exterior shell of a traditional rigid helmet H as shown in FIG. 5. The helmet cover sections 12, 14, 16 can be coupled to the back section 18 in the open position, or can be separate pieces that are only coupled to adjacent sections in the closed position. A series or plurality of supports 22 are disposed on an interior side of each section 12, 14, 16 and 18 of the helmet cover 10. The interior side of the helmet cover 10 is shown in FIG. 1. In assembly, the supports 22 are disposed adjacent or underneath the outer shell portions of the helmet cover sections 12, 14, 16 and 18 and are positioned adjacent the exterior shell of helmet H (FIG. 5). As shown in FIG. 1, the series of supports 22 are configured in a honeycomb pattern and the supports 22 are adapted to absorb and redirect an impact of a force realized on the helmet cover 10 such that the helmet cover 10 channels the energy of the impact around the helmet H (FIG. 5) as further described below. As shown in FIGS. 1-4, the helmet cover sections 12, 14, 16 and 18 are configured to wrap about the exterior shell of a football helmet H as shown in FIG. 5. Thus, the helmet cover sections 12, 14, 16 and 18 are adapted to provide a reciprocal configuration to the helmet covered by the helmet cover 10. In FIG. 5, a football helmet H is depicted, but it is contemplated that the helmet cover sections 12, 14, 16 and 18 can be configured to mirror the exterior shell of any helmet to which the helmet cover 10 is applied.

Figure 2:
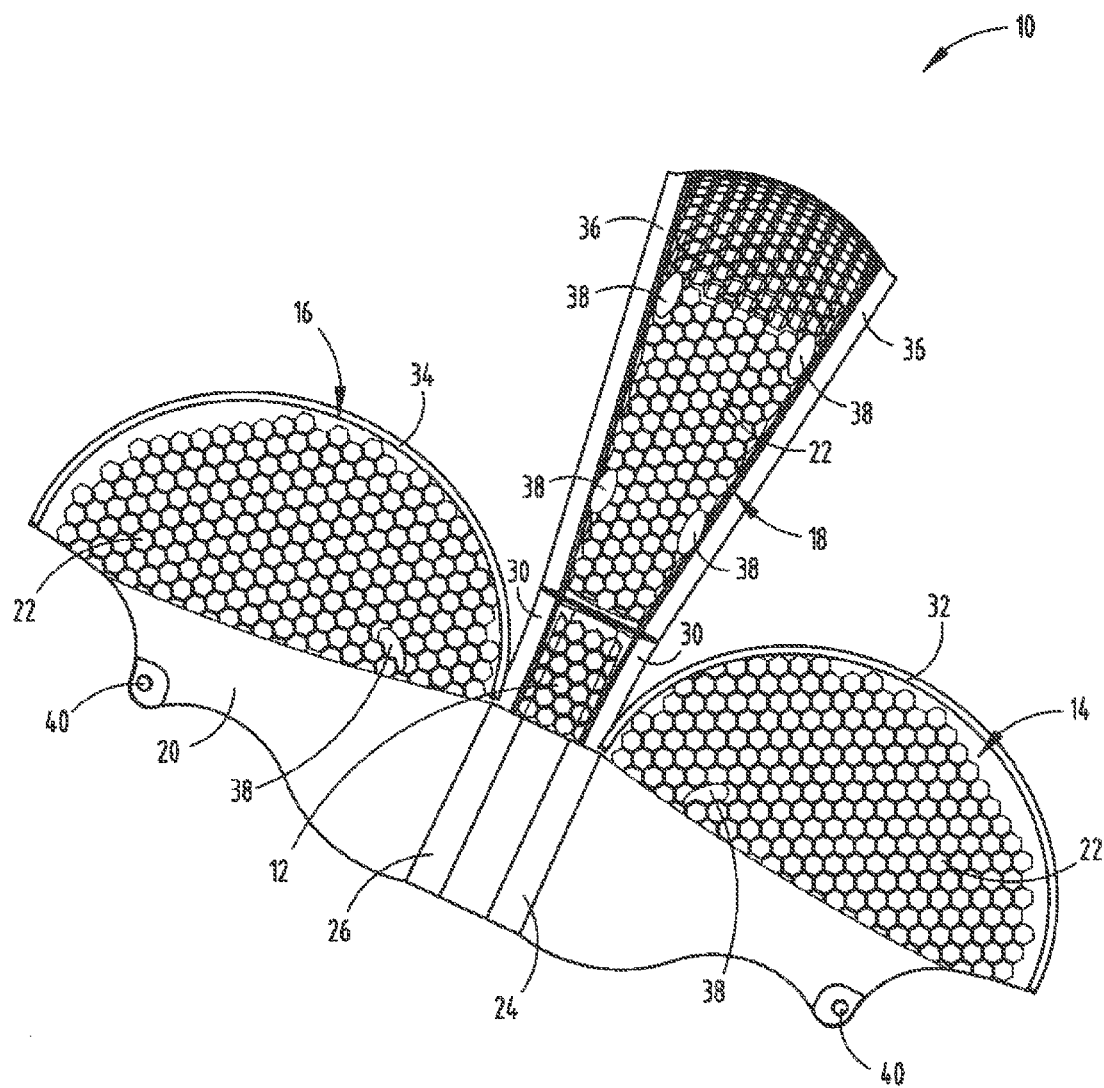
FIG. 2 is a rear elevational view of the helmet cover shown in FIG. 1, showing a partial view of an outer shell.
Figure 2A:
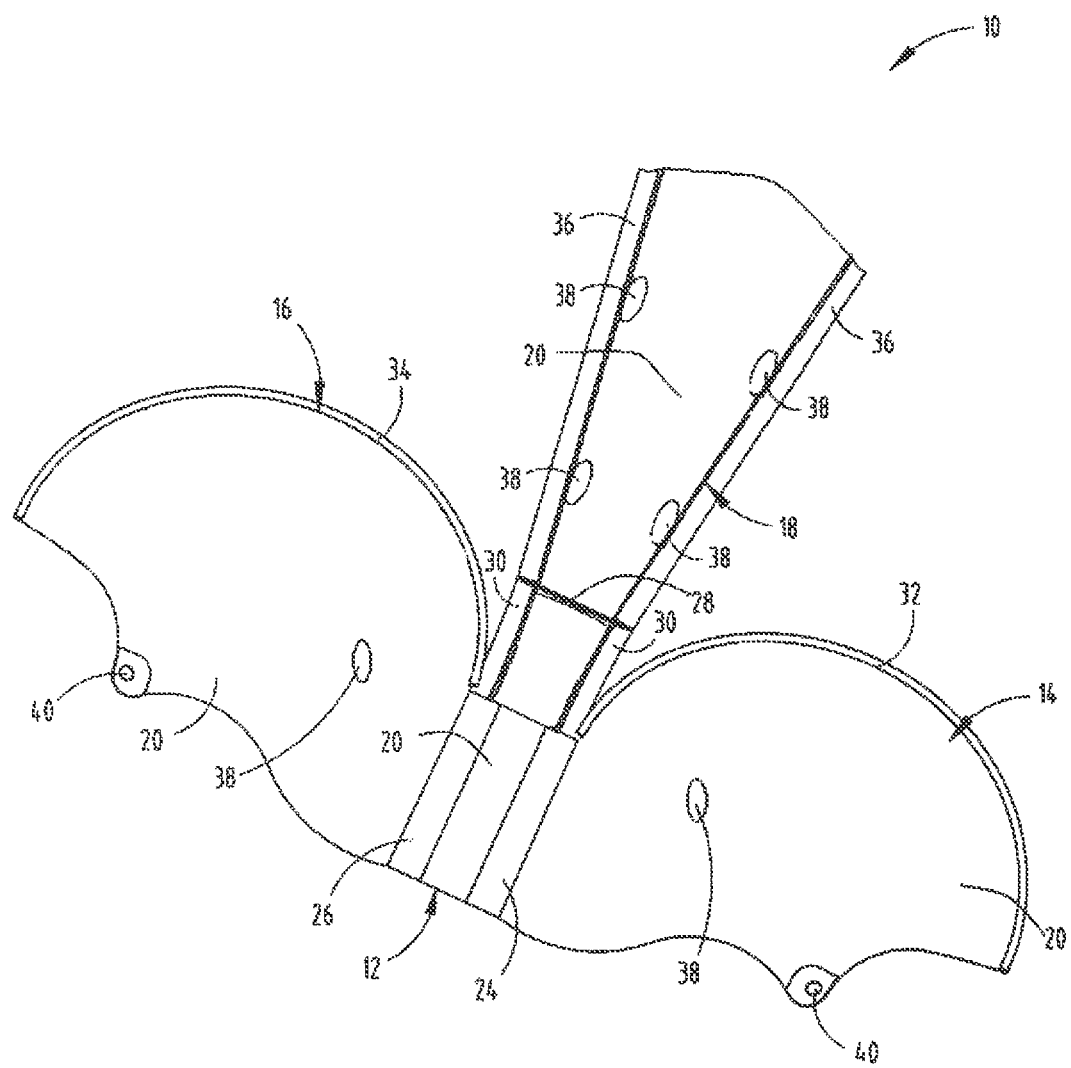
FIG. 2A is a rear elevational view of the helmet cover shown in FIG. 1.
Figure 3:
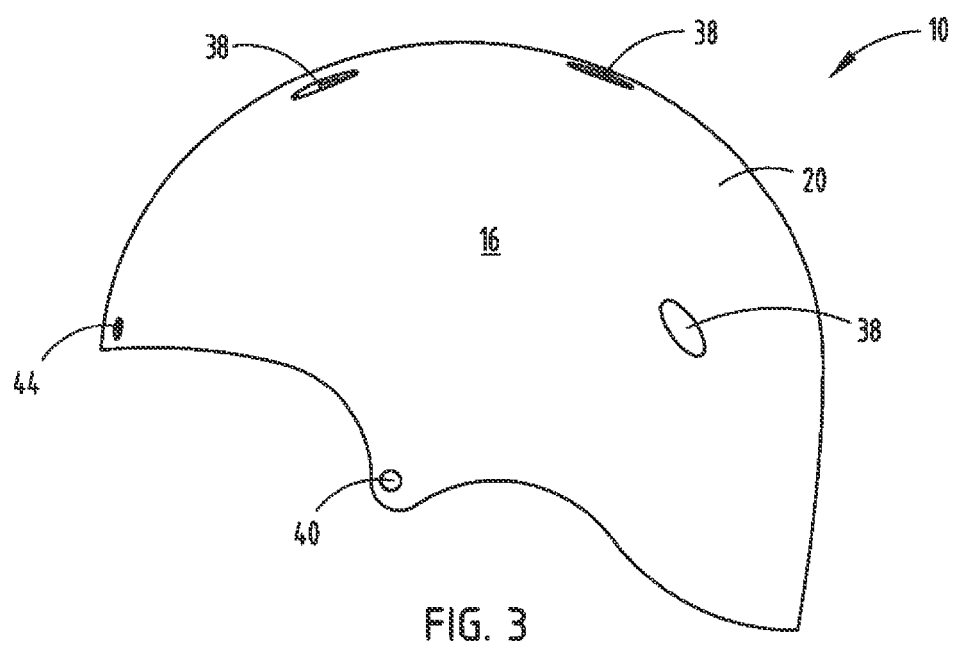
FIG. 3 is a side elevational view of the helmet cover shown in FIG. 1, in the closed position showing a full view of the external shell of the helmet cover.

Referring to FIGS. 1-3, the supports 22 and the outer shell 20 are adapted to collapse or fracture under a predetermined threshold force. The amount of force it takes for the supports 22 to collapse and outer shell 20 to fracture can be refined based on variables such as the material of manufacture, the thickness of the outer shell 20, the configuration of the supports 22 and the wall thickness of supports 22. Helmet cover 10 may be optimized in makeup and configuration to obtain a flex-to-fracture ratio in a range of about 5,000 psi to about 7,000 psi as measured by the Notch-Izod testing method standards. An impact force of about 5,000 psi to about 7,000 psi has the potential to injure an individual wearing helmet H with helmet cover 10, such that an individual receiving such a collision force during a collision event should be observed and the potential injury should be monitored. The ability of the outer shell 20 to fracture serves to indicate both that a potentially medically significant impact has occurred, and also the exact location of the impact force. Preferably, the helmet cover makeup and configuration provides for a helmet cover 10 having a flex-to-fracture ratio of about 6450 psi. Fractures to the outer shell 20 will be indicated at the sight of impact.

Materials which may be suitable for use in helmet cover 10 of the present invention include generally rigid polymeric materials having a fracture strength of about 5,000 psi to about 7,000 psi or less, such as certain thermoplastic materials. Appropriate thermoplastic materials may include impact modified polypropylene materials or blends of polycarbonate and polyester materials, such as those in the Xenoy® resin family commercially available at Sabic Innovative Plastics of Pittsfield, Mass. Acrylonitrile butadiene styrene (ABS) thermoplastics can be used to make the helmet cover 10 of the present invention. ABS thermoplastics are available in different grades and can be used for injection molding, extrusion, blow molding, foam molding, and thermoforming. ABS thermoplastics yield plastically at high stresses and the plastic yield can be modified to increase or decrease the impact resistance of the ABS material. For example, increasing the proportions of polybutadiene in relation to the styrene and acrylonitrile will cause for an increase in the impact resistance of the resultant ABS material. Thus, the ABS material for the helmet cover 10 of the present invention can be modified to have an impact resistance or plastic yield in a range of about 5,000 psi to 7,000 psi. The ABS material can be pigmented and are generally considered opaque, translucent, ivory or white in their natural state. The ABS resins can be either pigmented or coated to increase weather resistance or to produce a product having a plastic shiny or acrylic appearance. Further, the temperature at which an ABS plastic is molded can affect the impact resistance and strength of the ABS material. For example, molding at a lower temperature will increase the impact resistance and strength of the material while molding at a higher temperature will make the ABS product less impact resistant. Under high stresses, ABS plastics can stress-whiten at an area of impact which provides for a marker mechanism in the helmet cover 10 of the present invention as further described below. The polymeric material makeup of helmet cover 10 preferably has a specific gravity in the range of 1.0-1.5 grams/cu cm, in order to maintain a low profile and to reduce the weight of the helmet cover 10, such that the overall weight of helmet H to which the helmet cover 10 is attached is not greatly altered.

Having a polymeric material with a fracture strength in a range of about 5,000 psi to about 7,000 psi, the back section 12, side sections 14, 16 and top section 18 of the helmet cover 10 are generally rigid pieces with some ability to flex under lower impact loads, such as loads under 5000 psi. Thus, the supports 22 and outer shell 20 of sections 12, 14, 16 and 18 of the helmet cover 10 are designed to resist fracture when lower impact loads occur. Thus, the helmet cover 10 of the present invention is adapted to withstand impact forces of normal work or sports activities without needing replacement. While the helmet cover 10 described herein and shown in the accompanying figures depicts a helmet cover for use with a traditional football helmet, it is contemplated that the helmet cover of the present invention can be configured for use with any helmet used for any type of sports activity such as cycling, hockey, lacrosse, skiing, hiking, climbing, snowboarding and other such activities where a helmet is generally used. Further, the helmet cover 10 of the present invention can also be used with work related activities such as in the construction or road repair industries for example. Also, it is contemplated that the helmet cover 10 of the present invention will also have military applications to indicate when a wearer has received a potentially dangerous impact in the field.

The side sections 14, 16 of the helmet cover 10 are coupled to the back section 12 as shown in FIG. 1 via hinges 24, 26. Top section 18 is also attached to the back section 12 via a hinge 28. As shown in FIGS. 1 and 2, the hinges 24, 26 and 28 are preferably integrally formed with the helmet cover sections such that the entire helmet cover 10 can be formed from one piece to provide a unitary helmet cover 10 sectionally divided into sections 12, 14, 16 and 18. Further, it is contemplated that the hinges 24, 26 and 28 can be integrally formed living hinges which can be in the form of a flexible resilient polymeric material having a thinned wall section which allows for flexing at the hinged location, or can be a specific configuration of polymeric material which allows for resilient flexing such as a zigzag configuration.

Figure 4:
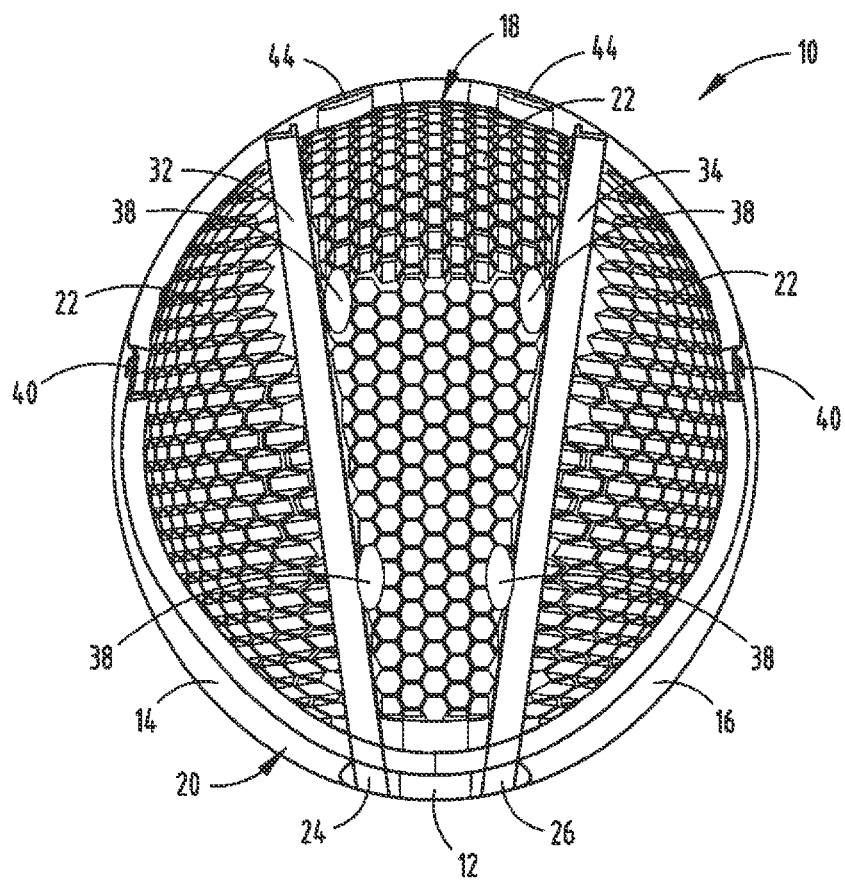
FIG. 4 is a bottom plan view of the helmet cover shown in FIG. 1, in the closed position.
Figure 5:
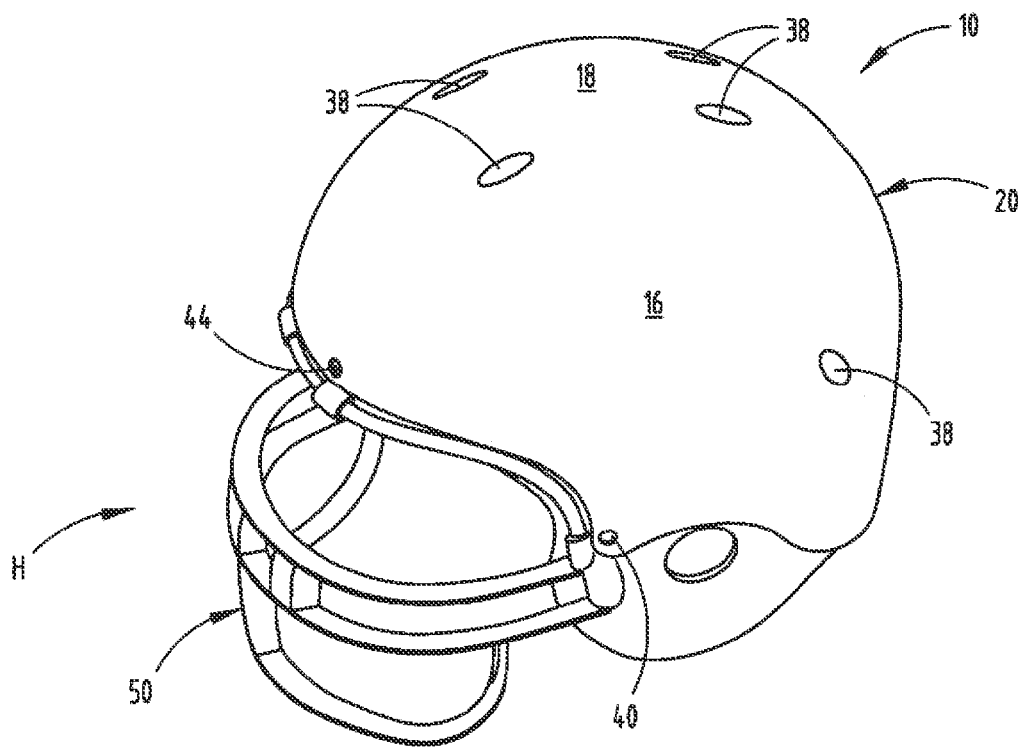
FIG. 5 is a perspective view of a helmet with a helmet cover disposed thereon.

Helmet cover 10 is shown in the open position in FIGS. 1-2, and in the assembled or closed position in FIGS. 3-4. When helmet cover 10 is in the closed position, each of the rigid sections 12, 14, 16 and 18 fits over the rigid exterior shell of helmet H. When in the closed position, helmet cover 10 comprises an outer shell 20 having a shape generally similar to that of the traditional helmet H, with a series of supports 22 supporting and reinforcing the outer shell 20, located between an exterior shell of helmet H and outer shell 20 of the helmet cover 10.

Helmet cover sections 12, 14, 16 and 18 have complimentary shaped intersecting edges 30, 32, 34 and 36 such that the helmet cover sections 12, 14, 16 and 18 can be tightly and securely closed to form an essentially unitary outer shell 20 (FIG. 3). The intersecting edges 30, 32, 34 and 36 can be complimentary in that they comprise tongue and groove configurations where adjacent edges intersect. Any other form of grooved overlay between adjacent sections is also contemplated for use with the intersecting edges 30, 32, 34 and 36 to guide the closing of the helmet cover 10 and assure proper assembly. A snap-fit assembly of intersecting edges is also contemplated to securely hold the helmet cover sections in place on the helmet H. Specifically, as shown in FIGS. 1 and 2, complimentary edges 30, 36 are disposed along the back section 12 and the top section 18 respectively. Edges 30, 36 are complimentary to edges 32, and 34 disposed on an outer perimeter of side sections 14, 16. The complimentary edges 30, 32, 34 and 36 and supports 22 on the interior portion of each section 12, 14, 16 and 18 are configured to appropriately interact to transfer energy between supports 22 of adjacent sections 12, 14, 16 and 18 when an impact load is realized on the helmet cover 10 in the closed position. Thus, as an impact load is realized on the helmet cover 10 during a collision event, the section of the helmet cover 10 absorbing the brunt of the impact force is aided by the ability of that section to redirect the impact force into adjacent sections 12, 14, 16 and 18 and the supports 22 associated with those sections. The redirection of the impact force is caused by the supports 22 and the lateral edges disposed between helmet sections that are connected in such a manner that energy can be transferred from one section to the next adjacent section. Thus, if an impact force where to occur where side section 16 received the brunt of the impact force, the outer shell 20 would stress whiten or fracture (based on the amount of force received), and the energy of that impact force would transfer and spread physically to adjacent helmet sections 12, 18 through the intersecting edges 30, 34 and 36 which are tightly interconnected without gaps to allow the impact force energy to effectively transfer and spread.

Sections 12, 14, 16 and 18 of the helmet cover 10 may also be provided with specific features designed to interact with the desired helmet H. Such features can include openings or apertures 38, such as those disposed on top section 18 and side sections 14, 16 as shown in FIG. 1, whereby the apertures 38 can align with and accommodate vents disposed on exterior shell of helmet H. Further, the helmet cover 10 can comprise apertures 40 adapted to accommodate the fastening of a face mask 50 (FIG. 5) or other add-ons of a particular helmet H.

To close helmet cover 10 from an open position (FIG. 1) to an assembled position over helmet H (FIG. 5), back section 12 is aligned with the center, rear portion of helmet H as side sections 14, 16 are folded inward until they have made contact with the outer rigid shell of helmet H. Next, top section 18 is folded downward, such that its lateral edges 36 interact with and engage edges 32, 34 of right and left side sections 14, 16. Thus, as shown in FIG. 4, the helmet cover 10 is in a closed position with side sections 14, 16 being folded inward such that lateral edges 32, 34 of the side sections 14, 16 are shown within the interior of the helmet cover 10 as shown in FIG. 4. Thus, in the closed position, as shown in FIG. 4, the lateral edges 36 of the top section 18 are disposed over the lateral edges 32, 34 of the side sections 14, 16.

Helmet cover 10 can be secured to helmet H using screws or other like fasteners 42 received through reinforced holes 44 disposed in top section 18. Additionally, fasteners such as snaps, hook and loop closures, adhesives or other fastener means can also be used to secure helmet cover 10 to the rigid outer shell of helmet H. Further, it is contemplated that reinforcing attachment apertures, such as reinforced holes 44, can be used in other locations on various sections of the helmet cover 10 to secure the helmet cover 10 to the rigid outer shell of helmet H.

The helmet cover 10 is preferably removably securable to helmet H, so that the helmet cover 10 can be removed from helmet H if the helmet cover 10 is damaged. As the helmet cover 10 is designed to fracture with an impact force less than that necessary to fracture helmet H over which it is placed, and because the helmet cover 10 absorbs and redirects the force of the impact, helmet H will receive less impact force than helmet cover 10 and may be undamaged by the force applied to helmet cover 10. Therefore, a damaged helmet cover 10 can be removed from helmet H, and a new helmet cover 10 secured to helmet H in its place.

The hinged connection of sections 12, 14, 16 and 18 of helmet cover 10 allows the helmet cover 10 to be easily installed on helmets H and also permit formation of helmet cover 10, including outer shell 20 and supports 22, in a single molding process using a mold which does not have any sliding or moving parts. This is because helmet cover 10 opens (FIG. 1), so that there are no opposing sides or interior sides, and a die which is moved in only one axis is able to stamp or injection mold the part.

As noted above, the helmet cover 10 has an outer shell 20 which is adapted to fracture when an impact load is realized on the outer shell 20 that is above a predetermined threshold force. The helmet cover 10 can be configured such that the threshold force is a force within a range from about 5,000 psi to 7,000 psi, or more preferably 6450 psi. As noted above, the impact force required to fracture the outer shell and collapse the supports 22 of the helmet cover 10 can be tailored by the configuration of the supports 22, the materials used to make the supports 22, the materials used to make the outer shell 20 and other such factors which would cause the threshold impact force to increase or decrease in assembly. Having helmet cover 10 with indicating fractures disposed on the outer shell 20 after an impact force has been realized that exceeds the impact force threshold for the helmet cover 10, allows for those around the individual wearing the helmet H to identify that a potentially dangerous impact has occurred. Thus, a fellow team member, coach or observer, can identify that a potentially dangerous impact has occurred such that the individual wearing the helmet H can be monitored for signs of injury or concussion.

The helmet cover 10 of the present invention further includes a marker mechanism which works in conjunction with the fracturing capabilities of the outer shell 20 and supports 22 to indicate that a serious impact has been realized on the helmet cover 10, and where that impact has occurred.

Figure 6:
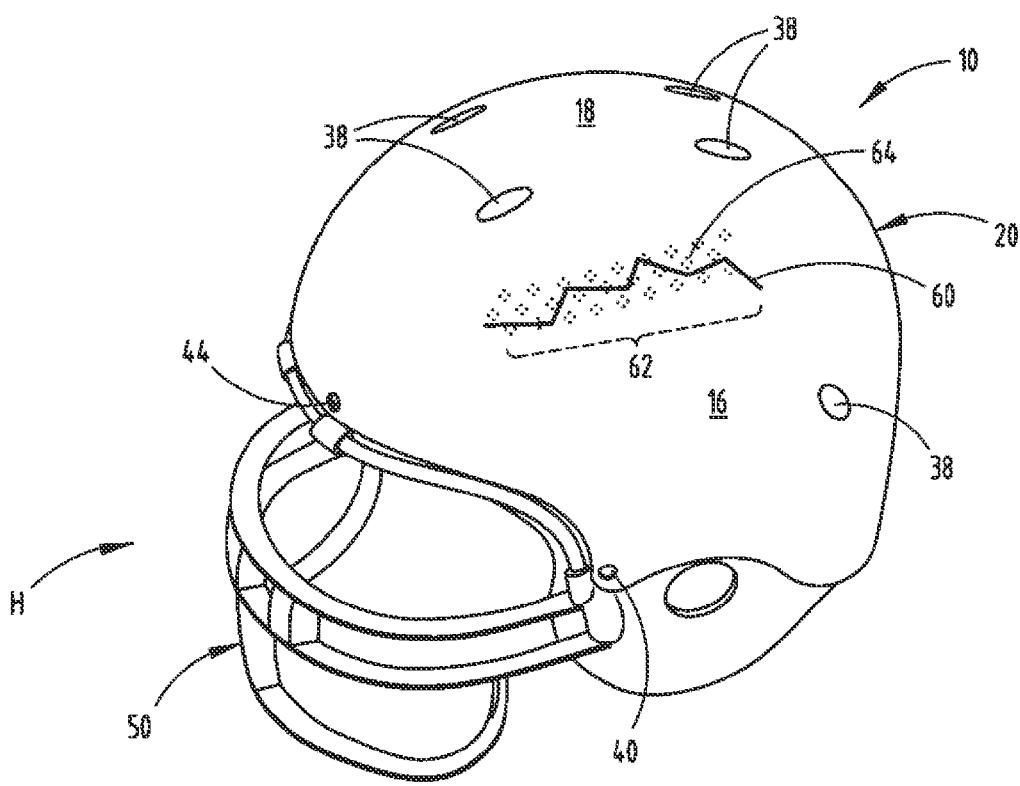
FIG. 6 is a perspective view of a helmet with a helmet cover disposed thereon, wherein the helmet cover has received an impact load causing a stress fracture.

As shown in FIG. 6, the helmet cover 10 is shown disposed on an exterior shell of helmet H wherein a stress fracture 60 is shown with an area 62 that has been stress-whitened by the impact received which caused the fracture 60. The stress fracture 60 has also caused polymer particles 64 to be released from the polymeric makeup of the helmet cover 10 such that these polymer particles, or ABS thermoplastic particles, are now deposited around the stress fracture 60 on the outer shell 20 of the helmet cover 10, thereby marking the area of impact. Such particles are also released as the supports 22 are fractured or collapse under an impact load wherein the particles would then be deposited on the exterior shell of the helmet H. In this way, the present invention indicates on the helmet cover where an impact has occurred that exceeds a predetermined impact threshold, such that the wearer of the helmet H with the helmet cover 10 can be appropriately cared for at the specific location of impact. Thus, the marker mechanism includes one or more fractures 60 to the unitary outer shell occurring during a collision event, wherein an impact force is realized on the helmet cover that exceeds the predetermined impact threshold. The marker mechanism further includes a deposit of polymer particles 64 released during the fracturing of the unitary outer shell 20 of the helmet cover 10.

As noted above, the polymeric material making up the helmet cover 10 can be a pigmented ABS thermoplastic such that when a stress fracture occurs, the particles 64 released from the stress fracture can be a contrasting color as compared to the exterior shell of the helmet H. In this way, the particles 64 released due to a fracture of the outer shell 20, the supports 22, or any other part of the helmet cover 10, can be easily identified against the exterior shell of the helmet H. Further, the helmet cover 10 can be impregnated with a dark color, such as black, to help indicate when a high impact has been received causing the ABS thermoplastic to stress-whiten at the point of impact. The stress-whitening, such as the stress-whitening area 62 shown in FIG. 6, can be more pronounced against a dark pigmented helmet cover. Thus, the helmet cover of the present invention can mark an area of impact by a stress fracture 60, stress-whiten areas 62, or polymer particles 64 being released from the polymeric material of the helmet cover 10.

The helmet cover 10 of the present invention serves to disperse forces of an impact load realized on the helmet cover 10 such that when the impact load realized on the helmet cover 10 exceeds a threshold impact load, the helmet cover 10 can indicate the specific location on the helmet cover 10 where the impact load was realized. The impact load indicators can be in the form of physical fractures 60 (FIG. 6) disposed on the outer shell 20, or particles 64 released due to the fracture, or a mark on the helmet cover caused by stress-whitening 64. These load indicators or marker mechanisms allow the wearer of the helmet, and others around the wearer, to know when a potentially dangerous impact force has occurred during a collision event, whereas the helmet, covered with the helmet cover, alone would not such a potentially dangerous impact occurrence. Being susceptible to breakage at about 11,000 psi, the helmet alone does not indicate when potentially dangerous impacts have occurred.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A polymeric helmet cover adapted to cover substantially all of an exterior shell of a helmet and indicate when an impact force has been realized on the helmet cover that exceeds a predetermined impact threshold, said helmet cover comprising:

a plurality of sections wherein each section is operably coupled to an adjacent section such that the helmet cover is moveable between an open position and a closed position; wherein the plurality of sections comprises a back section, a top section and first and second side sections, configured to form a unitary outer shell in the closed position, and wherein the back section is attached to the first and second side sections by a pair of hinges, wherein each hinge connects a side section to the back section;

an outer shell portion configured to cover substantially all of an exterior shell of a helmet; said outer shell portion disposed on an exterior side of each section of the plurality of sections;

a plurality of supports disposed on an interior side of each section, wherein the supports are disposed inwardly in a direction toward the exterior shell of said helmet, wherein the supports have a predeterminded fracture strength and are each adapted to absorb and redirect energy realized on said helmet cover by an impact force, and further wherein the plurality of supports are adapted to fracture under an impact force which exceeds said predetermined impact threshold; and a marker mechanism configured to indicate when an impact force has been realized on said helmet cover which exceeds said predetermined impact threshold.

2. The polymeric helmet cover of claim 1, wherein the unitary outer shell is adapted to fracture under an impact force which exceeds said impact threshold.

3. The polymeric helmet cover of claim 1, wherein, the hinges are living hinges of flexible resilient polymeric material.

4. The polymeric helmet cover of claim 1, wherein, the predetermined impact threshold is a predetermined impact threshold in a range from about 5000 psi to 7000 psi.

5. The polymeric helmet cover of claim 4, wherein, the predetermined impact threshold is 6050 psi.

6. The polymeric helmet cover of claim 5, wherein, the marker mechanism includes a fracture to the unitary outer shell occurring during a collision event wherein an impact force is realized that exceeds the predetermined impact threshold.

7. The polymeric helmet cover of claim 6, wherein, the marker mechanism further includes a deposit of polymer particles on the unitary outer shell of the helmet cover, wherein the polymer particles are released from a fracturing of the unitary outer shell.

8. The polymeric helmet cover of claim 7, wherein, the marker mechanism includes a deposit of polymer particles on the exterior shell of the helmet, wherein the polymer particles are released from a fracturing of the unitary outer shell.

9. The polymeric helmet cover of claim 5, wherein, the marker mechanism includes one or more fractures in the supports occurring during a collision event when an impact force is realized that exceeds the predetermined impact threshold.

10. The polymeric helmet cover of claim 9, wherein, the marker mechanism includes a deposit of polymer particles released from the fractures in the supports deposited on the exterior shell of the helmet.

11. A polymeric helmet cover adapted to cover substantially all of a helmet having an exterior shell and indicate when an impact force has been realized on the helmet cover that exceeds a predetermined impact threshold, said helmet cover comprising:
 a top section, first and second side sections, and a back section, wherein each section is operably coupled to an adjacent section such that the helmet cover is moveable between an open position and a closed position, and wherein the back section is connected to the first and second side sections by a pair of hinges, wherein each hinge connects a side section to the back section;
 an outer shell portion configured to cover substantially all of an exterior shell of a helmet; said outer shell portion disposed on an exterior side of the top section, the first and second side sections, and the back section, such that a unitary outer shell is formed when the helmet cover is in the closed position;
 a plurality of honeycomb supports disposed on an interior side of the top section, the first and second side sections, and the back section, wherein the supports are disposed adjacent to the exterior shell of said helmet, wherein the supports are each adapted to absorb and redirect energy realized on said helmet cover by an impact force, and further wherein each of the plurality of supports are adapted to fracture under an impact force which exceeds said predetermined impact threshold; and
 a marker mechanism configured to indicate when an impact force has been realized on the helmet cover which exceeds said predetermined impact threshold.

12. The polymeric helmet cover of claim 11, wherein, the helmet cover is comprised of an ABS thermoplastic.

13. The polymeric helmet cover of claim 12, wherein, the predetermined impact threshold is a predetermined impact threshold in a range from about 5000 psi to 7000 psi.

14. The polymeric helmet cover of claim 13, wherein, the unitary outer shell of the helmet cover is adapted to fracture when an impact force is realized on the helmet cover that exceeds the predetermined impact threshold.

15. The polymeric helmet cover of claim 14, wherein, the marker mechanism includes a fracture on the unitary outer shell when an impact force is realized on the helmet cover that exceeds the predetermined impact threshold.

16. The polymeric helmet cover of claim 15, wherein, the marker mechanism includes ASS thermoplastic particles from the fracture of the outer shell or supports deposited on the unitary outer shell of the helmet cover or on the exterior shell of the helmet.

17. The polymeric helmet cover of claim 11, wherein, the top section, the first and second side sections, and the back section are configured to be wrapped about the exterior shell of the helmet when the helmet cover is in the closed position on the helmet.

18. The polymeric helmet cover of claim 11, further comprising:
 fasteners adapted to removably fasten the helmet cover to the exterior shell of the helmet.

19. The polymeric cover of claim 11, wherein the hinges are integrally formed living hinges of flexible resilient polymeric material.

* * * * *

UNITED STATES PATENT AND TRADEMARK OFFICE
CERTIFICATE OF CORRECTION

PATENT NO. : 9,062,939 B2  
APPLICATION NO. : 13/546289  
DATED : June 23, 2015  
INVENTOR(S) : John P. Papp It is certified that error appears in the above-identified patent and that said Letters Patent is hereby corrected as shown below:

IN THE CLAIMS

Column 10, claim 16, line 28;
"ASS" should be --ABS--.

Column 10, claim 19, line 4;
After "polymeric" insert --helmet--.

Signed and Sealed this  
Ninth Day of February, 2016

Michelle K. Lee  
*Director of the United States Patent and Trademark Office*